INVENTOR
Henri JURANVILLE
ATTORNEY

United States Patent Office 3,457,465
Patented July 22, 1969

3,457,465
OSCILLATOR DETECTOR
Henri G. Juranville, 3 Rue de la Croix de Fer,
St.-Germain-en-Laye, France
Filed Aug. 19, 1966, Ser. No. 573,553
Claims priority, application France, Aug. 20, 1965,
28,987
Int. Cl. H01h 47/12
U.S. Cl. 317—146                                    3 Claims

ABSTRACT OF THE DISCLOSURE

This disclosure relates to an oscillation detector of the transistor type which is responsive to nearby metallic objects. The detector comprises a transistor having a parallel resistance capacitance circuit connected to the emitter of the transistor and a parallel reactance capacitance circuit connected to the collector of the transistor. A second reactance coupled to the reactance in the collector circuit of the transistor is connected at one terminal to the base of the transistor and at its other terminal to the intermediate terminal of a voltage divider connected across a direct-current source. A rectifying bridge is connected to the collector of the transistor and feeds a relay having distinct opening and closing potentials. When the oscillator is not affected by nearby metallic objects, it provides maximal amplitude signals and energizes the winding of the relay while, from a certain threshold, the incoming of a metallic object brings about a decrease of the oscillation and of the current in the winding which causes a sudden commutation of the relay, while the outgoing of the said metallic object causes an inverse sudden commutation of the relay.

---

Numerous types of oscillator detectors are already known which are responsive to the presence of nearby metallic objects having a good magnetic permeability and/or a good electric conductibility. A few of these detectors contain a self-capacitance oscillating circuit creating a H.F. magnetic field in the air around the apparatus; when a metallic object penetrates in this field, eddy currents are induced in the metal and the said eddy currents are opposed to the field from which they originate. A supplementary charge for the oscillator is therefore obtained. It results in that the amplitude of the oscillations decreases. If the metallic body is taken out of the field, the oscillations return to their maximal amplitude. This variation may be detected by providing two distinct states to an output circuit: the first corresponding to a case where the amplitude of the oscillations is maximal, the other to the case where the amplitude is reduced.

This type of detector is interesting because it is responsive to the presence of all metals, even sheet metals. It does not require a material contact between the object to be detected and the detector and no attraction force appears on the detected object.

The variation in the amplitude of the oscillations is, for example, detected by a diode or a transistor and then amplified by transistor, the shaping of the output signal being obtained by a Schmitt flip-flop circuit.

The above described devices will generally use a plurality of transistors, sometimes a transformer, and will require a direct current supply which increases the bulkiness and the cost of the installations.

It is an object of the present invention to provide a detector having an oscillating circuit which may be fed either directly by an alternative current supply or by a direct current source, in which the output circuit is completely independent from the supply and is particularly simple, economical and not cumbersome.

Another object of the invention consists in obtaining a clean commutation of the output circuit regardless of the speed and the direction of movement of the metallic object forming a screen in front of the tuned circuit.

According to the invention, the detector has an external reaction oscillator comprising a transistor having connected to its emitter a resistor and a capacitance in parallel whose second common terminal is connected to one of the terminals of the direct current supply, and to the collector of said transistor a self-capacitance circuit LC in parallel whose reactance L is magnetically coupled with a second reactance connected to the base of the said transistor, the second common point of the circuit LC being connected to the second terminal of the current supply, while the second extremity of the second reactance is connected in a point of a potential divider connected to the terminals of the current supply, a third capacitance being connected, on one end, to the collector of the said transistor and on the other hand, to a common point of one of the diagonals of a diode bridge or a rectifier bridge whose second common point is connected to the said second terminal of the current supply, while the extremities of the second diagonal of the bridge constitutes the connection terminals of an electro-magnetic relay whose opening and closing voltages have a definite difference, in consideration for which, when the oscillator is not affected by nearby metallic objects, it delivers maximal amplitude signals and energizes the relay winding, while from a certain threshold, the incoming of a metallic object produces an important weakening of the oscillations and of the current in the winding, which provokes an abrupt commutation of one or all the relay contacts, the outgoing of the object producing an inverse abrupt commutation.

According to another characteristic of the invention, the electro-magnetic relay is advantageously constituted by a vacuum tube having flexible contact springs operated by a surrounding winding.

According to another characteristic of the invention, the whole device may be fed either directly by a continuous current or by a monophased alternative current through a filtering circuit constituted by a diode and a resistor in series and a capacitance in parallel.

According to another characteristic of the invention, the transistor is preferably of the silicium n-p-n type.

The following description and the annexed drawings are given as nonlimitative examples. They will explain how the invention may be realized. The particularities which derive from the drawings and the text are obviously forming part of the said invention.

First, the oscillator, which is represented by the reference I will be described. It consists of a silicium transistor of the n-p-n type wherein the collector is connected to a self-capacitance oscillating circuit $L_2C$, whose reactance $L_2$ is magnetically coupled to a reactance $L_1$ connected to the transistor. A potential divider $R_1$, $R_2$ determines the potential of the said basic circuit through the reactance $L_1$.

The transmitting circuit consists of a resistor $R_E$ which stabilizes the operation during the temperature variations because the said resistor produces a feedback effect which is opposed to the variations of the collector current. A capacitance $C_E$ is connected to its terminals. This capacitance presents a low reactance at the operating frequency which is nevertheless sufficient to create a feedback in a dynamic state which can be measured by varying it.

Figure 1:
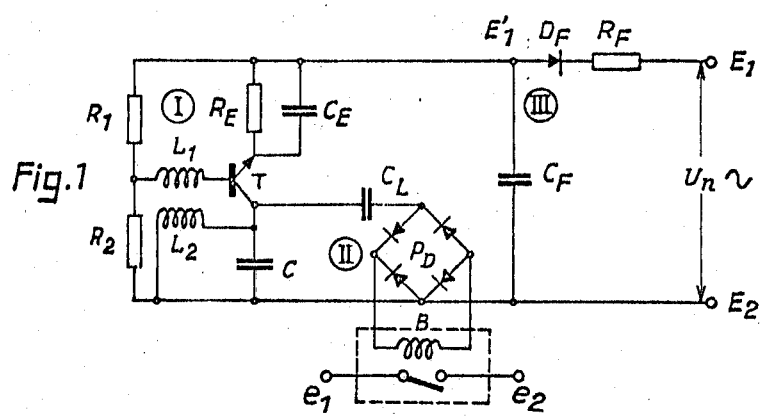
FIG. 1 represents the circuit of the detector according to the invention.

The electro-magnetic relay and its supply circuit are identified as II in FIG. 1. The relay is constituted by a winding B which acts on a switch having contact springs sealed in a glass tube, the terminals of the said contact springs being $e_1$ and $e_2$. The capacitance $C_L$ connects the collector of the transistor T to the winding of the relay through a diode bridge $P_D$ having four elements. This capacitance stops the continuous component of the current of the transistor and the relay is fed by the alternative component which is rectified by the diode bridge.

The filtering circuit is indicated by the reference III. It consists of a diode $D_F$ and a resistor $R_F$ connected in series in the monophased supply circuit $E_1$, $E_2$, a capacitance $C_F$ being connected in parallel between a terminal of the alternative current supply and the anode of the diode. In the case where the detector is fed by a continuous current, a suitable voltage supply source is connected to points $E_1$ and $E_2$.

The oscillating circuit $L_2C$ practically defines the operating frequency of the oscillator. The self-inductance $L_1$ inductively coupled with $L_2$ applies to the base T the required positive reaction to maintain the oscillations in a closed loop system. So that the oscillations may be generated from a weak distrubance, it is necessary that the loop gain be real and equal or greater than 1. It is therefore not possible to give any arbitrary value to the capacitance $C_E$ and this value determines the sensitivity of the detector.

The only transistor T has a double function, that is, an oscillator and an amplificator. The capacitance $C_L$ which connects the collector of the transistor T to the diode bridge and to the winding of the relay serves to eliminate the continuous component of the current and to control the adaptation of the load. The highest the capacitance the greatest is the energy supplied to the load. Since the transistor must supply the energy to maintain the oscillations, the capacitance $C_L$ must not go above a certain value beyond which the oscillator would stop.

It therefore results that the values of the capacitance $C_E$ and $C_L$ are interdependent because they perform the distribution of the available energy to the transistor between the oscillator and the load which constitutes the relay. It is therefore preferable to have a maximum of energy so as to have an adjustable lock-in range for the detector and for that reason a silicium transistor of the n-p-n type is used. Nevertheless, a germanium of the p-n-p type having a sufficient power could also be used. A switch having flexible contact springs is also of interest in the present arrangement because it requires only a low load supply. Moreover, its closing potential is sufficiently different from its opening potential so that the contact opens or closes without vibration regardless of the moving speed of the metallic piece constituting a screen in front of the windings of the oscillator. It is obvious that any other electro-magnetic relay of any type whether it is a classical type or not which would have a low consumption and a difference between the closing and opening potentials would also be suitable.

Figure 2:
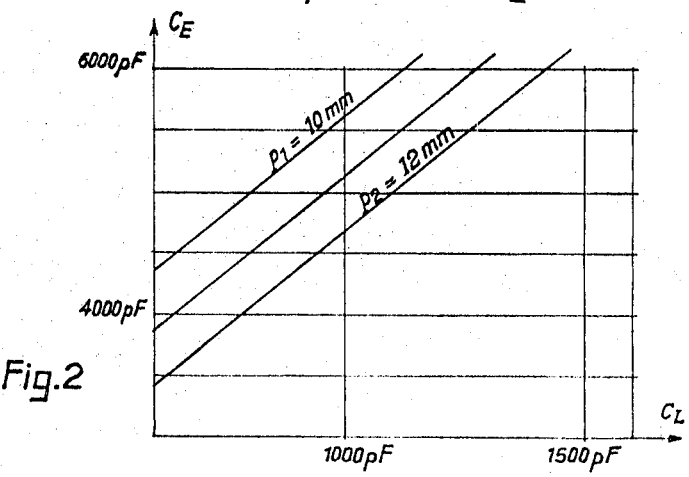
FIG. 2 represents the variation of the capacitance $C_E$ as a function of $C_L$ for constant distances of a metallic object.
Figure 3:
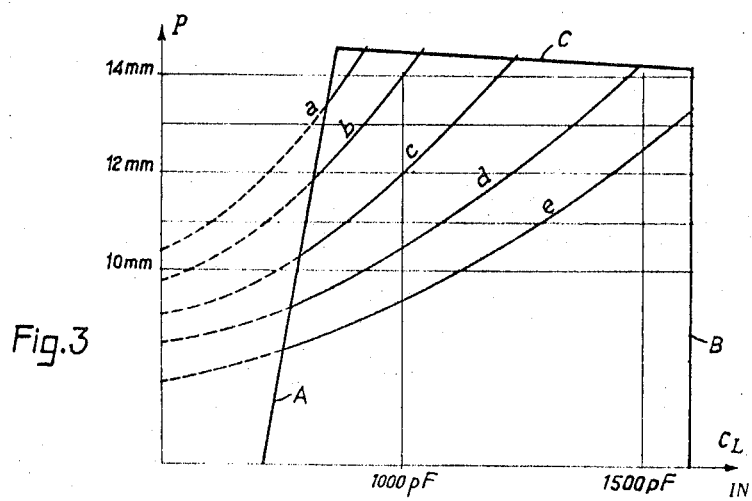
FIG. 3 represents, for a given screen, the range in which an operation may be obtained when the capacitances $C_E$ and $C_L$ vary.

In FIG. 2, the variation of the capacitance $C_E$ in function of the capacitance $C_L$ is represented. In fact, as the value of $C_E$ and of $C_L$ are related, a value of $C_E$ corresponds to only one value of $C_L$, for which the commutation of the relay contacts is produced in the same position for a given metallic object. It has been observed in a surprising manner that the representative curves of these variations for a commutation happening for the same object at a given distance are substantially straight lines. These straight lines have been represented in FIG. 2 for constant distances of the object of 10 to 12 mm. FIG. 3 gives the variation limits of the capacitance $C_E$ and $C_L$. As it has been indicated above, the capacitance $C_E$ and $C_L$ cannot have certain values; if the capacitance $C_L$ is too low, the current delivered to the winding becomes insufficient to obtain its energization. Similarly, if the capacitance is too high, the load of the oscillator becomes too great and it stops. In a similar manner, if the capacitance $C_E$ is too low, the supplementary load brought by the presence of a metallic object is not sufficient to reduce the amplitude of the oscillations and provoke the commutation of the relay.

In FIG. 3, some curves have been represented to illustrate the characteristics of the distance P of the object in function of the capacitance $C_L$ for various values of the capacitance $C_E$ taken as a parameter at the supply voltage. Curves a, b,, c, d, e have been obtained which correspond to the increasing values of $C_E$ going from 3,000 to 6,000 pf., when $C_L$ varies from 500 to 1,800 pf., the said distances of the object vary up to about fifteen millimeters.

In FIG. 3, the three straight lines A, B, C delimit the range of the good operation of the apparatus when $C_E$ and $C_L$ vary.

The curve A delimits the range of the minimal values of $C_L$ which provides a sufficient energy to control the relay: for the values of $C_L$ lower than the limit values defined by this curve, the current in the winding is insufficient and the relay cannot engage alone.

The curve B delimits the range of the maximal values of $C_L$ which provide a good operation of the detector; for the values of $C_L$ above the limit values defined by this curve, the oscillator is too highly loaded and after having operated the detection the oscillations do not start over again. The differential range of the detector has then become infinite.

The curve C delimits the range of the maximal distances of the metallic objects: at distances above these limits, the presence of the object is not detected regardless of the values of $C_E$ and $C_L$.

It is obvious that modifications may be brought up to the embodiments above described by the substitution of equivalent technical means without departing from the purpose of the present invention.

The embodiments of the invention in which an exclusive property or privilege is claimed are defined as follows:

1. An oscillator detector of the transistor type which is responsive to nearby metallic objects having a good magnetic permeability and/or a good electric conductibility, the said detector consisting of an oscillator of the external reaction type comprising:
   (a) a direct-current supply having first and second terminals;
   (b) a transistor having a base, an emitter and a collector;
   (c) a first circuit consisting of a resistor and a capacitance connected in parallel, said first circuit having one terminal connected to the emitter of said transistor and its other terminal connected to the first terminal of said direct-current supply;
   (d) a self-capacitance circuit constituted by a first reactance and a second capacitance in parallel connected at one terminal to the collector of said transistor and at its other terminal to the second terminal of said direct current supply;
   (e) a second reactance magnetically coupled to said first reactance and connected at one terminal to the base of said transistor;
   (f) a voltage divider connected across the first and second terminals of said direct-current supply, the voltage divider having an intermediate terminal connected to the other terminal of said second reactance;
   (g) a third capacitance connected at one terminal to the collector of said transistor;
   (h) a rectifying bridge having a first and a second diagonal, one terminal of the first diagonal being connected to the other terminal of said third capacitance and the second terminal of the first diagonal of the rectifying bridge being connected to the second terminal of the direct-current supply; and (i) an electro-magnetic relay having a winding connected across the second diagonal of said rectifying bridge, said relay having distinct opening and closing potentials, whereby when the oscillator is not affected by nearby metallic objects, it provides maximal amplitude signals and energizes the winding of the relay while, from a certain threshold, the incoming of a metallic object brings about a decrease of the oscillations and of the current in the winding which causes a sudden commutation of the relay, while the outgoing of said object causes an inverse sudden commutation of the relay.

2. An oscillator detector as recited in claim 1, wherein the electro-magnetic relay consists of a vacuum tube relay having flexible contact springs operated by a surrounding coil.

3. An oscillator detector as recited in claim 1, wherein the direct current supply consists of alternative current passing through a filtering circuit consisted by a diode and a resistor in series and a capacitance in parallel.

References Cited

UNITED STATES PATENTS

| 2,907,931 | 10/1959 | Moore | 317—146 X |
| 2,985,848 | 5/1961 | Raffaelli | 317—146 X |
| 3,034,022 | 5/1962 | Worland | 317—146 |
| 3,100,879 | 8/1963 | Greunke | 317—146 X |

FOREIGN PATENTS

| 815,911 | 7/1959 | Great Britain. |
| 1,003,465 | 2/1957 | Germany. |

LEE T. HIX, Primary Examiner

U.S. Cl. X.R.
331—65, 117